United States Patent [19]

Buma

[11] Patent Number: 4,768,758
[45] Date of Patent: Sep. 6, 1988

[54] SUPPORT STRUCTURE FOR AIR SUSPENSION MECHANISM

[75] Inventor: Shuuichi Buma, Toyota, Japan

[73] Assignee: Toyota Jidosha Kabushiki Kaisha, Toyota, Japan

[21] Appl. No.: 75,219

[22] Filed: Jul. 20, 1987

Related U.S. Application Data

[63] Continuation of Ser. No. 831,824, Feb. 24, 1986, abandoned.

[30] Foreign Application Priority Data

Feb. 26, 1985 [JP] Japan .............................. 60-25515[U]

[51] Int. Cl.⁴ .......................... F16F 9/04; F16F 9/46; B60G 11/62; B60G 11/26
[52] U.S. Cl. ................................ 267/64.21; 188/299; 267/35; 280/707
[58] Field of Search ............. 267/33, 35, 64.19, 64.21, 267/64.23, 64.24, 64.25, 64.27, 64.28, 195, 217, 218, 226, 219, 220, 221, 286; 188/298, 299, 321.11, 322.16, 319; 280/668, 707, 714

[56] References Cited

U.S. PATENT DOCUMENTS 3,376,032 4/1968 Schmid ............................. 267/8 R
4,364,582 12/1982 Takahashi et al. ........... 267/64.23 X
4,592,540 6/1986 Yokoya et al. ..................... 267/218

FOREIGN PATENT DOCUMENTS 3447750 7/1985 Fed. Rep. of Germany .
57-110515 7/1982 Japan .
59-62746 4/1984 Japan .
0241538 11/1985 Japan .

Primary Examiner—Andres Kashnikow
Assistant Examiner—Robert J. Oberleitner
Attorney, Agent, or Firm—Oblon, Fisher, Spivak, McClelland & Maier

[57] ABSTRACT

An air suspension surrounding a shock absorber with a housing fixed to a car body and an elastic body to form an air chamber includes a first support member connected with a piston rod of the shock absorber, a second support member disposed at the outside of the first support member and connected with the housing, an O-ring interposed between the first and second support members to maintain the air chamber under the airtight condition and a stopper provided in relation with one of the support members and spaced from the other in an axial direction of the piston rod. The O-ring is disposed in a position to maintain the air chamber with airtightness when the stopper abuts against the first or second support member.

7 Claims, 1 Drawing Sheet

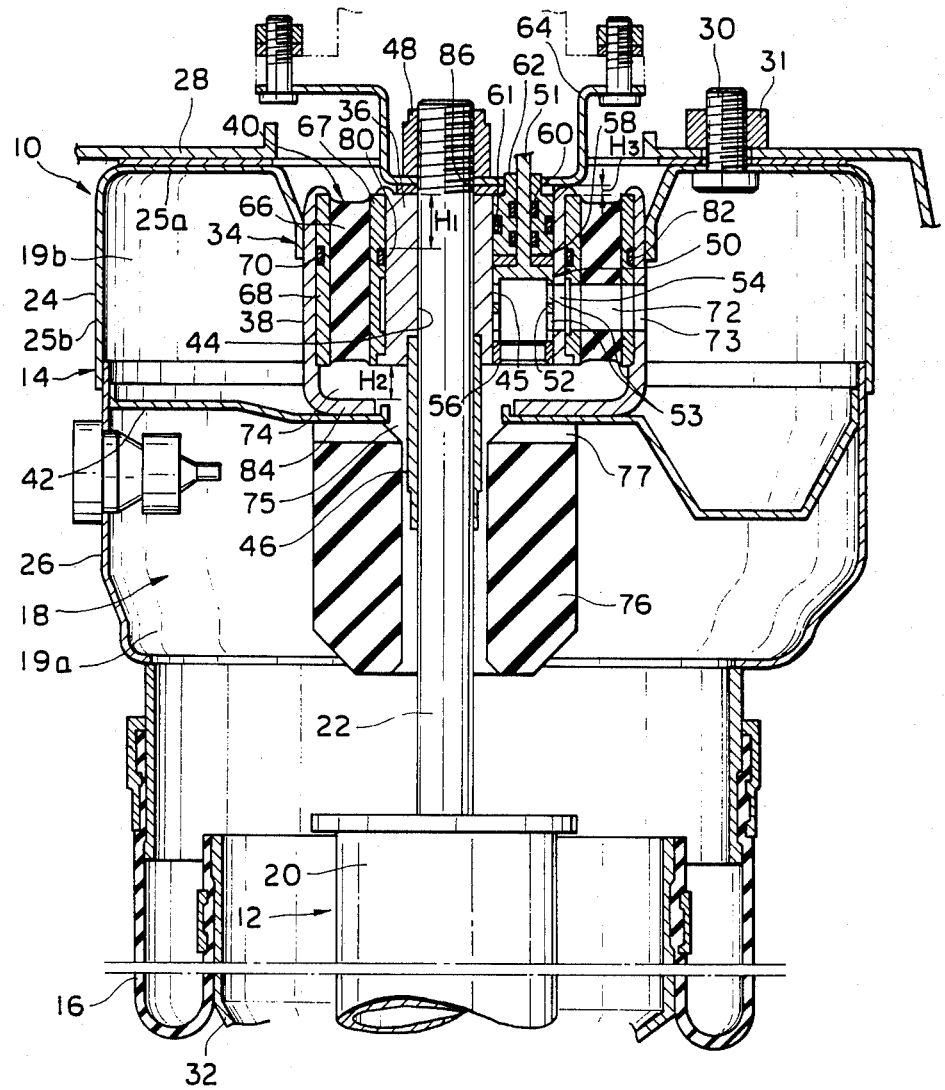

SUPPORT STRUCTURE FOR AIR SUSPENSION MECHANISM

This application is a continuation of application Ser. No. 831,824, filed on 2/24/86, now abandoned.

BACKGROUND OF THE INVENTION

1. Field of the Invention

This invention relates to an air suspension mechanism and, more particularly, to an air suspension mechanism which can separate a load of a shock absorber from a load of an air spring.

2. Description of the Prior Art

There is provided an air suspension in which an air chamber is formed to surround a shock absorber and the air chamber is filled with compressed air to constitute an air spring (for example, Japanese Patent Public Disclosure (KOKAI) No. 110515/82). In this air suspension mechanism, an air tank for the air chamber is mounted on a piston rod of the shock absorber and the piston rod is connected with a car body through a support including a rubber bushing above the mounting portion of the air tank.

Since the air tank is connected with the piston rod in said air suspension mechanism, the load of the air spring in addition to the load of the shock absorber is applied to the support so that the strength of the support should be increased.

An air suspension mechanism which mounts a housing for forming the air spring on the car body while connecting a piston rod of a shock absorber with a support fixed to the housing can transmit the load of the air spring directly to the car body and the load of the shock absorber through the support to the car body to provide a so-called input separating type of air suspension mechanism. Therefore, the strength of the support can be made as small as possible.

SUMMARY OF THE INVENTION

In the input separating type of air suspension, a support member connected with the piston rod of the shock absorber and a support member connected with the housing are provided for the supports for convenience of manufacture to fit the former in the latter directly or through a bushing assembly, and a seal member such as 0-ring is disposed in a gap between the fit portions for maintaining airtightness of the air chamber.

Both support members are connected with each other by press fiting or caulking one of them after press fiting. However, loads are applied individually to the air spring and the shock absorber to serve to move both support members relatively to each other. As a result, both support members may be disengaged from each other.

The present invention provides an air suspension mechanism which can prevent the air chamber from air leakage when both support members are disengaged from each other.

According to the present invention, an air suspension mechanism surrounding a shock absorber with a housing fixed to a car body and an elastic body to form an air chamber comprises a first support member connected with a piston rod of said shock absorber, a second support member disposed at the outside of said first support member and connected with said housing, a seal member interposed between said first and second support members to maintain said air chamber with airtightness and a stopper provided in relation with one of said first and second support members and spaced from the other in an axial direction of said piston rod, said seal member being disposed in a position to maintain said air chamber with airtightness when said stopper abuts against said first or second support member.

When the first and second support members are disengaged from each other, the stopper fixed to one of both support members abuts against the other of the support members to be held at the position of the abutment. Since the seal member is then placed in a position to maintain the air chamber with the airtightness, air does not leak from the air chamber.

Since the housing is fixed to the car body and provided with the support for connecting the piston rod of the shock absorber, the strength of the support can be set to the low one. Also, when the rubber bushing is disposed in the support, the rubber bushing can be set as soft as possible to provide a better ride comfort.

When the first and second support members are disengaged from each other the stopper abuts against either of the members to block further movement of them and ensure airtightness of the air chamber by the seal member. Therefore, the car height can be prevented from reduction due to the occurrence of air leakage from the air chamber to maintain safety.

BRIEF DESCRIPTION OF THE DRAWING

Other objects and features of the invention will become apparent from the following description of a preferred embodiment of the invention with reference to the accompanying sole FIGURE, in which:

The drawing is a sectional view showing principal parts of an air suspension.

DESCRIPTION OF THE PREFERRED EMBODIMENT

An air suspension mechanism 10 surrounds a shock absorber 12 with a housing 14 and an elastic body 16 to form an air chamber 18.

The shock absorber 12 which is well known per se is provided with a cylinder 20, a piston (not shown) and a piston rod 22. A suspension arm (not shown) is connected with a lower end of the cylinder 20, and a support, which will be later described is connected with an upper end of the piston rod 22.

In the embodiment shown, the housing 14 consists of a first member 24 and a second member 26. A top 25a of the first member 24 is disposed facing a car body 28, and a plurality of bolts 30 (one of them is shown in the drawing) welded to the first member is an airtight manner extend through the car body 28 and nuts 31 are screwed onto the bolts 30 to fix the top 25a to the car body 28. A tubular portion 25b of the first member 24 extends downward from the top 25a to be fitted onto the second tubular member 26 and welded thereto over the whole periphery with airtightness.

In the embodiment shown, the cylindrical elastic body 16 is a diaphragm formed of rubber, one end of the diaphragm folded back in the middle being mounted on the second member 26 of the housing and the other end being mounted on an air piston 32 fixed on the cylinder 20 to define the air chamber 18 surrounding the shock absorber 12 together with the housing 14. The air chamber 18 is filled with compressed air to constitute an air spring.

The housing 14 is provided with a support 34 which has a first support member 36 and a second support member 38 formed respectively of high rigidity material like iron. In the embodiment shown, the second support member 38 has a bushing assembly 40. The top 25a of the first member 24 of the housing is welded to the second support 38 in an airtight manner and further a partition member 42 is welded to the same in an airtight manner. An outer peripheral portion of the partition member 42 is welded to the second member 26 of the housing with airtightness. Thus, the air chamber 18 is partitioned into a lower main air chamber 19a and an upper auxiliary air chamber 19b.

The first support member 36 has a hole 44 through which the piston rod 22 extends and a hole 45 into which a valve body is inserted. The piston rod 22 extends through the hole 44 and the first support member 36 is sandwiched between a holder 46 fixed to the piston rod 22 and a nut 48 screwed onto the piston rod 22 so that the piston rod 22 is connected with the first support member 36.

A valve body 50 is disposed rotatably in the hole 45 of the first support member 36. In the embodiment shown, since the air chamber 18 consists of the main and auxiliary air chambers 19a, 19b, the valve body 50 affords and interrupts communication between both air chambers. The valve body 50 has a bored hole 52 opening to a lower end and holes 53 extending from the bored hole 52 diametrally. As will be later described, when the valve body 50 is disposed in a predetermined position, an operating portion 51 having reduced diameter projects upward from the first support member 36, and the holes 53 can communicate to a hole 54 extended from the hole 45 of the first support member 36 diametrally to an outer peripheral surface. That is, when the valve body 50 is in the position shown in the drawing, the holes 53 of the valve body 50 communicate to the hole 54 of the first support member 36, and when the valve body 50 is rotated by 90° for example, the holes 53 are isolated from the hole 54.

The valve body 50 is held by a cylindrical spacer 56 press fitted in the lower portion of the hole 45 of the first support member, a low friction plate 58 disposed on an upper side of the valve body 50 and a holder 62 provided on inner and outer peripheral surfaces with 0-rings 60,61 respectively and press fitted in the upper portion of the hole 45. The valve body 50 is non-rotatably connected through the operating portion 51 to an actuator (not shown) supported by a bracket 64 connected with the piston rod 22 by the nut 48, and rotated by the actuator.

When the air chamber 18 is partitioned into the main air chamber 19a and the auxiliary air chamber 19b while the valve body 50 is constituted to afford and interrupt communication between both air chambers, the soft spring constant can be held by affording communication between both air chambers during travelling and the hard spring constant can be held by interrupting communication between both air chambers to provide the spring constant corresponding to the travelling condition. However, the air chamber 18 may be used without the partition, and in this case the valve body 50 disposed in the first support member 36 and the actuator may be omitted and the partition member 42 is removed.

The bushing assembly 40 has a rubber bushing 66 and inner and outer tubes 67,68 respectively vulcanized and bonded to the rubber bushing. The bushing assembly 40 is connected with the second support member 38 by press fitting the outer tube 68 which mounts an 0-ring 70 for holding the air chamber 18 in an airtight manner in the second support member 38, and by caulking the second support member 38. The outer tube 68 may be omitted. In this case, the rubber bushing 66 is bonded directly to the second support member 38. To the rubber bushing 66 is applied the load from the piston rod 22, while this load is generally small so that the rubber bushing 66 can be formed as soft as possible.

The bushing assembly 40 has a hole 72 communicating to the hole 54 of the first support member 36, and the second support member 38 has a hole 73 communicating to the hole 72 and opening to the auxiliary air chamber 19b. On the other hand, the bored hole 52 of the valve body 50 communicates to a space 74 surrounded by the second support member 38, and the space 74 communicates to the main air chamber 15a through a gap 75 and a hole 77 provided in a bound stopper 76.

A seal member 80 is interposed between the first support member 36 and the second support member 38 to maintain the air chamber 18 in an airtight manner. In the embodiment shown, the seal member is an 0-ring disposed in a groove 82 formed on the inner tube 67. The groove 82 is located at an interval $H_1$ from an upper end face of the first support member 36. The first support member 36 is press fitted in the inner tube 67 and connected with the inner tube 67 by caulking the first support member 36.

A stopper 84 is provided in the second support member 38 and located at an interval $H_2$ from a lower end face of the first support member 36 in the axial direction of the piston rod 22. In the embodiment shown, the stopper 84 comprises a flange projecting integrally inwardly from the second support member 38. On the other hand, the bracket 64 supporting the actuator is fixed to the first support member 36 through a spacer 86 and located at an interval $H_3$ from an upper end of the tube 67 of the bushing assembly 40 to provide a stopper. Here, $H_1$ is larger than $H_2$ and $H_1$ larger than $H_3$ In the embodiment shown, while the first support member 36 and the inner tube 67 and the second support member 38 and the outer tube 68 are respectively fixed to each other by caulking, the connection between the first support member 36 and the inner tube 67 has the weakest fixing force. Thus, the characteristic of the seal member 80 located in the position having the weakest fixing force is ensured by said stoppers. That is, when the first support member 36 is disengaged from the inner tube 67 and the inner tube 67 abuts against the bracket 64 or the stopper 84 abuts against the first support member 36, the seal member 80 is held between the first support member 36 and the inner tube 67 as it was under the above mentioned requirement so that the airtight characteristic of the air chamber 18 can be maintaianed.

In the embodiment shown, the stoppers are provided at intervals in a downward direction from the first support member 36 and in a upward direction from the bushing assembly 40 of the second support member. Instead, either one of the stoppers may be provided.

When the rubber bushing 66 is bonded to the first support member 36 without interposing the inner tube therebetween and the outer tube 68 constitutes the first support member, the seal member 70 interposed between the outer tube 68 and the second support member 38 is disposed at a position to maintain the air chamber 18 in an airtight manner when one of the stoppers abuts against either one of the support members.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States:

1. An air suspension mechanism, surrounding a shock absorber, having a piston rod, with a housing fixed to a car body and an eleastic body to form an air chamber, comprising:
   a first support member formed separately from the car body and said piston rod of said shock absorber and having a hole through which the piston rod extends, the first support member being connected with the piston rod;
   a second support member disposed at the outside of said first support member and connected with said housing;
   a tubular rubber bushing provided on one of said first and second support members, said first support member being connected with the car body through the rubber bushing, the second support member and the housing;
   a seal member interposed between said first and second support members to maintain said air chamber under an airtight condition; and
   a stopper provided in relation with one of said first and second support members and spaced from the other in an axial direction of the piston rod,
   wherein said seal member is disposed in a position to maintain said air chamber in an airtight manner when said stopper abuts against one of said first and second support members.

2. An air suspension as claimed in claim 1, wherein said stopper comprises a flange projecting integrally inwardly from said second support member.

3. An air suspension mechanism as claimed in claim 1, wherein said stopper comprises a member fixed to said piston rod.

4. An air suspension mechanism as claimed in claim 1, wherein a rubber bushing is disposed between said first and second support members.

5. An air suspension mechanism, surrounding a shock absorber, with a housing fixed to a car body and an elastic body to form an air chamber, comprising:
   a first support member connected with a piston rod of said shock absorber;
   a second support member disposed outside said first support member and conencted with said housing;
   a seal member interposed between said first and second support members to maintain said air chamber under an airtight condition;
   main and auxiliary air chambers formed by separating said air chamber;
   a valve for affording and interrupting communication between said main and auxiliary chambers; and
   a member fixed to said piston rod above said first support member and spaced from said second support member in an axial direction of said piston rod, the member functioning as a stopper,
   wherein said seal member is disposed in a position to maintain said air chamber in an airtight manner when said member abuts against said second support member.

6. An air suspension mechanism as claimed in claim 5, wherein said valve is disposed in said first support member.

7. An air suspension mechanism, surrounding a shock absorber, with a housing fixed to a car body and an elastic body to form an air chamber, comprising:
   a first support member connected with the piston rod of said shock absorber;
   a second support member disposed outside the first support member and connected with said housing;
   a seal member interposed between said first and second support members to maintain said air chamber under an airtight condition;
   a member fixed to said piston rod above said first support member and spaced from said second support member in an axial direction of said piston rod, wherein said member comprises a stopper, and the distance between the member and the second support member being less than that between an upper face of said first support member and said seal member; and
   a flange projecting integrally inwardly from said second support member below the first support member and spaced from the first support member in the axial direction of the piston rod, the flange functioning as a stopper, and the distance between the flange and said first support member being less than that between the upper face of said first support member and said seal member.

* * * * *